(12) United States Patent
Takeda et al.

(10) Patent No.: US 9,915,938 B2
(45) Date of Patent: Mar. 13, 2018

(54) ADJUSTMENT APPARATUS FOR ADJUSTING PROCESSING UNITS PROVIDED IN A SUBSTRATE PROCESSING APPARATUS, AND A SUBSTRATE PROCESSING APPARATUS HAVING SUCH AN ADJUSTMENT APPARATUS

(71) Applicant: EBARA CORPORATION, Tokyo (JP)

(72) Inventors: Koichi Takeda, Tokyo (JP); Takamasa Nakamura, Tokyo (JP)

(73) Assignee: EBARA CORPORATION, Tokyo (JP)

(*) Notice: Subject to any disclaimer, the term of this patent is extended or adjusted under 35 U.S.C. 154(b) by 585 days.

(21) Appl. No.: 14/596,531

(22) Filed: Jan. 14, 2015

(65) Prior Publication Data

US 2015/0241866 A1    Aug. 27, 2015

(30) Foreign Application Priority Data

Jan. 20, 2014 (JP) .................................. 2014-007654

(51) Int. Cl.
*G06F 19/00* (2011.01)
*G05B 19/418* (2006.01)

(52) U.S. Cl.
CPC .. *G05B 19/4184* (2013.01); *G05B 2219/2602* (2013.01); *G05B 2219/31044* (2013.01); *G05B 2219/32139* (2013.01); *Y02P 90/04* (2015.11); *Y02P 90/14* (2015.11); *Y02P 90/16* (2015.11); *Y02P 90/18* (2015.11); *Y02P 90/185* (2015.11)

(58) Field of Classification Search
None
See application file for complete search history.

(56) References Cited

U.S. PATENT DOCUMENTS 5,276,879 A * 1/1994 Barry .................... G06F 9/52
709/203
5,467,295 A * 11/1995 Young ................... G06F 13/364
709/208

(Continued)

FOREIGN PATENT DOCUMENTS

CN      2910476 U    6/2007
CN    202780832 U    3/2013

(Continued)

OTHER PUBLICATIONS

Search Report issued in Singapore Patent Application No. 10201500360R dated Nov. 2, 2016.

*Primary Examiner* — Adam Lee
(74) *Attorney, Agent, or Firm* — Pearne & Gordon LLP

(57) ABSTRACT

An adjustment apparatus capable of adjusting various types of processing units of a substrate processing apparatus within a shorter period of time is disclosed. The adjustment apparatus includes a main operation device configured to manipulate the processing units and adjust the designated operations, terminal operation devices configured to manipulate the processing units and adjust the designated operations, a network that connects the processing units and the main operation device to each other; and connecting devices configured to connect the terminal operation devices to the network and disconnect the terminal operation devices from the network. Each of the terminal operation devices is configured to be able to manipulate at least one of the processing units.

16 Claims, 7 Drawing Sheets

(56) References Cited

U.S. PATENT DOCUMENTS

| | | | |
|---|---|---|---|
| 5,471,588 A * | 11/1995 | Nimishakavi | G06F 13/1663 710/113 |
| 5,548,728 A * | 8/1996 | Danknick | G06F 5/065 709/213 |
| 6,038,630 A * | 3/2000 | Foster | G06F 13/1684 709/231 |
| 6,269,279 B1 | 7/2001 | Todate et al. | |
| 6,298,274 B1 * | 10/2001 | Inoue | G05B 19/4189 700/112 |
| 6,336,204 B1 * | 1/2002 | Jevtic | H01L 21/67276 414/936 |
| 6,363,434 B1 * | 3/2002 | Eytchison | H04L 12/40058 375/E7.019 |
| 6,389,449 B1 * | 5/2002 | Nemirovsky | G06F 9/30123 712/228 |
| 6,421,721 B1 * | 7/2002 | Dadsetan | G06F 9/5011 709/223 |
| 6,532,509 B1 * | 3/2003 | Wolrich | G06F 9/3851 710/240 |
| 6,623,333 B1 | 9/2003 | Patel | |
| 6,789,056 B2 * | 9/2004 | Vinnakota | H04L 12/66 370/236 |
| 7,020,879 B1 * | 3/2006 | Nemirovsky | G06F 9/4818 712/23 |
| 7,143,410 B1 * | 11/2006 | Coffman | G06F 9/526 718/100 |
| 7,257,814 B1 * | 8/2007 | Melvin | G06F 9/3004 710/200 |
| 7,477,948 B1 * | 1/2009 | Jain | G05B 19/4148 700/9 |
| 7,552,122 B1 * | 6/2009 | Georgiev | G06F 11/203 |
| 7,856,346 B2 * | 12/2010 | Nightingale | G06F 17/5022 700/100 |
| 7,870,272 B2 * | 1/2011 | Berkowitz | G06F 17/30017 709/217 |
| 8,082,045 B1 * | 12/2011 | Ashizawa | G05B 19/41865 700/121 |
| 2002/0007408 A1 * | 1/2002 | Kalhour | G06F 9/50 709/225 |
| 2002/0103708 A1 * | 8/2002 | Kloubakov | G06Q 20/20 705/21 |
| 2002/0199057 A1 * | 12/2002 | Schroeder | G06F 9/52 711/108 |
| 2003/0023340 A1 * | 1/2003 | Kitamoto | G05B 19/4184 700/121 |
| 2003/0046034 A1 | 3/2003 | Kitamoto et al. | |
| 2003/0149630 A1 * | 8/2003 | Jacobs | G06Q 20/20 705/17 |
| 2003/0154001 A1 * | 8/2003 | Oh | G05B 19/41865 700/217 |
| 2004/0107240 A1 * | 6/2004 | Zabarski | G06F 9/546 709/201 |
| 2004/0133477 A1 * | 7/2004 | Morris | A47F 9/047 705/21 |
| 2004/0216103 A1 * | 10/2004 | Burky | G06F 9/3836 718/100 |
| 2005/0010706 A1 * | 1/2005 | Lee | G06F 13/364 710/113 |
| 2005/0015535 A1 * | 1/2005 | Lindsay | H04L 12/40032 710/306 |
| 2005/0015601 A1 * | 1/2005 | Tabi | G06F 21/6227 713/182 |
| 2005/0071467 A1 * | 3/2005 | Douceur | G06F 9/52 709/224 |
| 2005/0273400 A1 * | 12/2005 | Blankenship | G06F 13/387 705/28 |
| 2006/0031595 A1 * | 2/2006 | Vorbach | G06F 15/7867 710/8 |
| 2006/0048150 A1 * | 3/2006 | Huang | G06F 9/4843 718/100 |
| 2006/0139699 A1 * | 6/2006 | Hara | H04N 1/32112 358/462 |
| 2007/0010906 A1 * | 1/2007 | Abe | H01L 21/67253 700/121 |
| 2007/0198730 A1 * | 8/2007 | Tsai | G06F 13/3625 709/230 |
| 2007/0266057 A1 * | 11/2007 | Utsumi | G06F 17/30011 |
| 2007/0286009 A1 * | 12/2007 | Norman | G11C 5/02 365/230.03 |
| 2008/0089426 A1 * | 4/2008 | Wang | H04N 19/44 375/240.24 |
| 2008/0134187 A1 * | 6/2008 | Lajolo | G06F 9/485 718/102 |
| 2009/0043419 A1 * | 2/2009 | Yamazaki | H01L 21/67069 700/228 |
| 2009/0070774 A1 * | 3/2009 | Raikin | G06F 9/466 718/108 |
| 2009/0094128 A1 * | 4/2009 | Kloubakov | G06Q 20/20 705/21 |
| 2009/0217265 A1 * | 8/2009 | Ishikawa | G06F 9/45504 718/1 |
| 2009/0265486 A1 * | 10/2009 | Jenkins | G06F 9/5011 710/60 |
| 2009/0319073 A1 * | 12/2009 | Zhang | G05B 19/41865 700/112 |
| 2010/0082788 A1 * | 4/2010 | Mundy | G06F 9/52 709/223 |
| 2010/0115167 A1 * | 5/2010 | Tardieux | G06F 13/362 710/240 |
| 2010/0131958 A1 * | 5/2010 | Cazorla Almeida | G06F 9/52 718/104 |
| 2010/0325630 A1 * | 12/2010 | Flood | G06F 9/466 718/101 |
| 2011/0082892 A1 * | 4/2011 | Ogasawara | G06F 9/526 707/819 |
| 2011/0264250 A1 * | 10/2011 | Nishimura | C23C 14/12 700/96 |
| 2012/0010743 A1 * | 1/2012 | Asai | H01L 21/67775 700/108 |
| 2012/0023498 A1 * | 1/2012 | Sundararaman | H04L 47/621 718/102 |
| 2012/0120468 A1 * | 5/2012 | Binkert | H04L 12/433 359/107 |
| 2013/0138786 A1 * | 5/2013 | Ji | H04L 65/1016 709/223 |
| 2013/0178954 A1 * | 7/2013 | Mizuguchi | G05B 15/02 700/78 |
| 2013/0191443 A1 * | 7/2013 | Gan | H04L 67/1097 709/203 |
| 2014/0121791 A1 * | 5/2014 | Nakamura | G05B 15/02 700/90 |
| 2015/0019731 A1 * | 1/2015 | Abts | G06F 13/1642 709/226 |

FOREIGN PATENT DOCUMENTS

| | | |
|---|---|---|
| JP | 2003-022116 A | 1/2003 |
| JP | 2005-085784 A | 3/2005 |
| WO | 200035628 A1 | 6/2000 |
| WO | 01/64395 A2 | 9/2001 |

\* cited by examiner

ADJUSTMENT APPARATUS FOR ADJUSTING PROCESSING UNITS PROVIDED IN A SUBSTRATE PROCESSING APPARATUS, AND A SUBSTRATE PROCESSING APPARATUS HAVING SUCH AN ADJUSTMENT APPARATUS

CROSS REFERENCE TO RELATED APPLICATION

This document claims priority to Japanese Patent Application Number 2014-007654 filed Jan. 20, 2014, the entire contents of which are hereby incorporated by reference.

BACKGROUND

A substrate processing apparatus is a complex device capable of performing a series of processing operations including operations of polishing, cleaning, and drying a substrate, such as a wafer. Such a substrate processing apparatus is constituted by a variety of processing units including polishing units, cleaning units, drying units, transporting units, etc. These processing units are assembled together in a manufacturing factory that manufactures substrate processing apparatus. Before a substrate processing apparatus is shipped from the manufacturing factory, operations of each of the processing units thereof are adjusted in order to ensure that the substrate processing apparatus works properly in its entirety.

It is important for a manufacturer of a substrate processing apparatus to ship the substrate processing apparatus to a customer promptly after the manufacturer has received an order from the customer. After the shipment, it is also important to adjust operations of the substrate processing apparatus in a customer's facility so that the substrate processing apparatus can start working immediately. Further, in order to make a downtime of the substrate processing apparatus as short as possible, it is also necessary to reduce a time of maintenance that is to be carried out periodically.

However, since the substrate processing apparatus is an assembly of multiple processing units, it takes a considerable time to adjust the operations of the substrate processing apparatus before and after the shipment from the manufacturer. Furthermore, it takes a long time to carry out the periodic maintenance of the substrate processing apparatus. This is because the substrate processing apparatus is equipped with only a single adjusting device. Specifically, since the adjusting device is capable of adjusting only one processing unit at a time, it takes a long period of time to complete the adjustment of all the processing units. In particular, a longer period of time is required for adjustment of a state-of-the-art substrate processing apparatus, because there are a lot of items to be adjusted for achieving a high throughput.

SUMMARY OF THE INVENTION

According to an embodiment, there is provided an adjustment apparatus capable of adjusting various types of processing units of a substrate processing apparatus within a shorter period of time. Further, there is provided a substrate processing apparatus having such an adjustment apparatus.

Embodiments, which will be described below, relate to an adjustment apparatus for adjusting a plurality of processing units in a substrate processing apparatus for processing a substrate, such as a wafer. The embodiments also relate to a substrate processing apparatus having such an adjustment apparatus.

In an embodiment, there is provided an adjustment apparatus for adjusting processing units for performing designated operations on a substrate, comprising: a main operation device configured to manipulate the processing units and adjust the designated operations; terminal operation devices configured to manipulate the processing units and adjust the designated operations, each of the terminal operation devices being configured to be able to manipulate at least one of the processing units; a network that connects the processing units and the main operation device to each other; and connecting devices configured to connect the terminal operation devices to the network and disconnect the terminal operation devices from the network.

In an embodiment, the main operation device has an interlock function that does not permit any two of the main operation device and the terminal operation devices to simultaneously manipulate any one of the processing units.

In an embodiment, the terminal operation devices are configured to send adjustment parameters, which have been used to adjust the processing units, to the main operation device, and the main operation device is configured to store the adjustment parameters therein.

In an embodiment, the adjustment parameters stored in the main operation device are shared by all of the main operation device and the terminal operation devices through the network.

In an embodiment, the main operation device and the terminal operation devices have the same software therein and work according to the software.

In an embodiment, the main operation device and the terminal operation devices have the same user interfaces.

In an embodiment, the terminal operation devices are configured to automatically download the software stored in the main operation device through the network, and install the downloaded software therein.

In an embodiment, the number of terminal operation devices is the same as the number of processing units.

In an embodiment, there is provided a substrate processing apparatus comprising: processing units for performing designated operations on a substrate; and the above-described adjustment apparatus for adjusting the processing units.

According to the above-described embodiments, the main operation device and the terminal operation devices are coupled to the processing units through the network. Therefore, the main operation device and the terminal operation devices are capable of simultaneously adjusting the operations of the processing units. As a result, the processing units of the substrate processing apparatus can be adjusted within a shorter period of time.

The terminal operation devices can be connected to and disconnected from the network through the connecting devices. Accordingly, the number of terminal operation devices to be used to adjust the processing units can easily be increased or reduced.

DESCRIPTION OF EMBODIMENTS

Embodiments will be described below with reference to the drawings.

Figure 1:
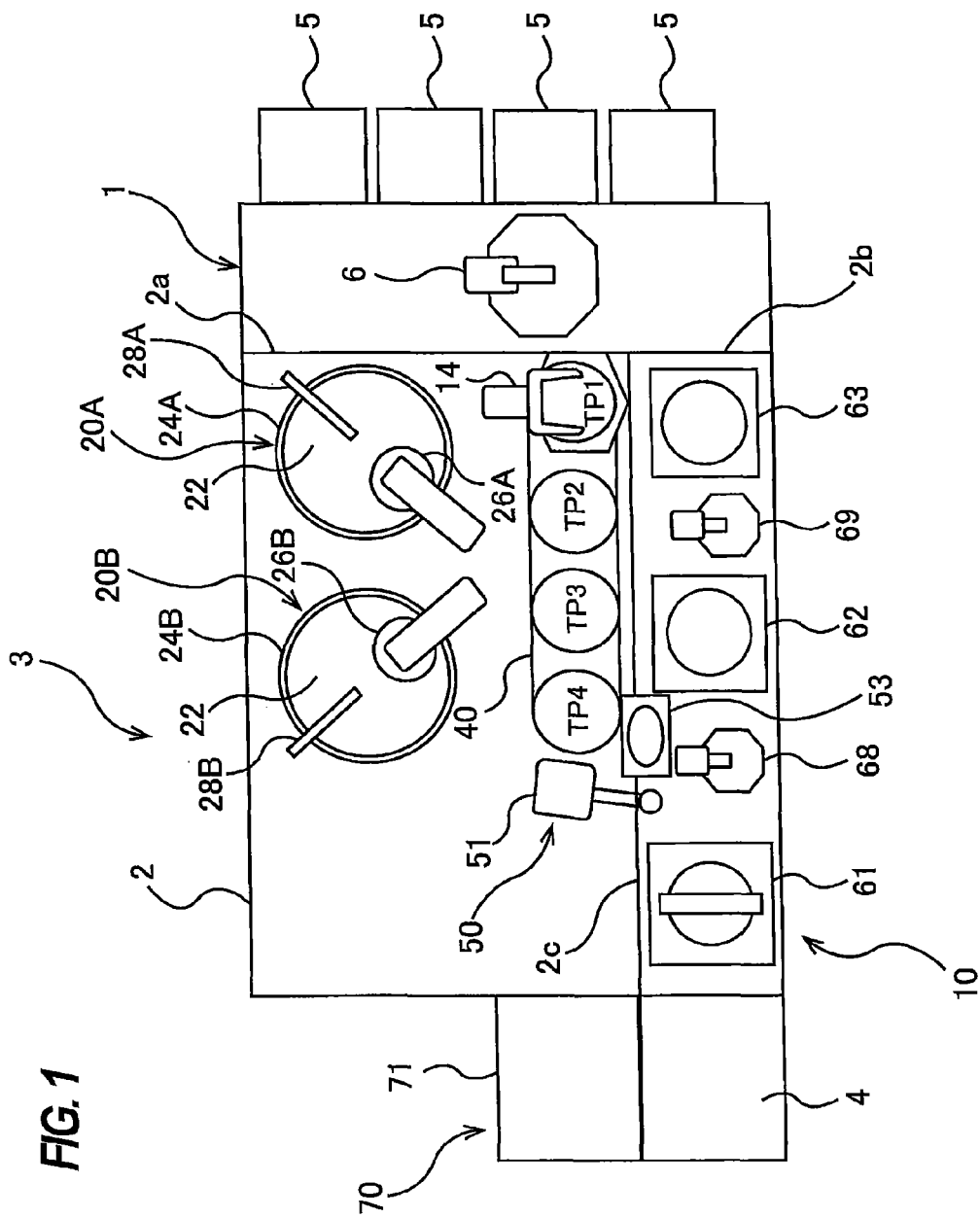
FIG. 1 is a plan view of a substrate processing apparatus according to an embodiment.

FIG. 1 is a plan view of a substrate processing apparatus according to an embodiment. This substrate processing apparatus is a complex apparatus capable of performing a series of processes including polishing, cleaning, and drying of a substrate, such as a wafer. As shown in FIG. 1, the substrate processing apparatus has a housing 2 in approximately a rectangular shape. An interior space of the housing 2 is divided by partitions 2a, 2b, 2c into a loading and unloading section 1, a polishing section 3, and a cleaning section 10. The substrate processing apparatus includes an operation controller 4 configured to control processing operations.

The loading and unloading section 1 includes a plurality of load ports 5 for receiving thereon wafer cassettes each storing a plurality of wafers (substrates) therein. In this loading and unloading section 1, a first transporting unit (loader) 6, which can move along the load ports 5, is disposed. The first transporting unit 6 can access the wafers in the wafer cassettes placed on the load ports 5.

The polishing section 3 is an area in which a surface of a wafer is chemically and mechanically polished. This polishing section 3 includes a first polishing unit 20A and a second polishing unit 20B. The first polishing unit 20A includes a first polishing table 24A to which a polishing pad 22 having a polishing surface is attached, a first top ring 26A for holding a wafer and pressing the wafer against the polishing pad 22 on the first polishing table 24A, and a first polishing liquid supply nozzle 28A for supplying a polishing liquid (or slurry) onto the polishing pad 22.

Similarly, the second polishing unit 20B includes a second polishing table 24B to which a polishing pad 22 is attached, a second top ring 26B, and a second polishing liquid supply nozzle 28B.

A second transporting unit 40 is disposed adjacent to the first polishing unit 20A and the second polishing unit 20B. The second transporting unit 40 is a linear transporter for transporting a wafer between four transfer positions (i.e., a first transfer position TP1, a second transfer position TP2, a third transfer position TP3 and a fourth transfer position TP4).

An inverting device 14 for receiving the wafer from the first transporting unit 6 is disposed adjacent to the first transfer position TP1. The wafer is transferred from the first transporting unit 6 to the second transporting unit 40 via this inverting device 14. The wafer is inverted by the inverting device 14 such that a surface, to be polished, faces downward. The inverted wafer is transferred from the inverting device 14 to the second transporting unit 40 and is then transported to the polishing unit 20A and/or the polishing unit 20B by the second transporting unit 40. The top ring 26A of the first polishing unit 20A is movable between a position above the first polishing table 24A and the second transfer position TP2 by a swing motion of the top ring 26A. Therefore, the transfer of the wafer between the top ring 26A and the second transporting unit 40 is performed at the second transfer position TP2.

Similarly, the top ring 26B of the second polishing unit 20B is movable between a position above the polishing table 24B and the third transfer position TP3, and the transfer of the wafer between the top ring 26B and the second transporting unit 40 is performed at the third transfer position TP3.

A third transporting unit 50 is disposed adjacent to the second transporting unit 40. Further, a buffer station 53 is disposed adjacent to the third transporting unit 50. This buffer station 53 is located between the polishing section 3 and the cleaning section 10. The third transporting unit 50 has a swing arm 51 for holding a wafer and transporting the wafer. This third transporting unit 50 is a swing transporter configured to swing its swing arm 51 to transport the wafer from the fourth transfer position TP4 to the buffer station 53.

Figure 2:
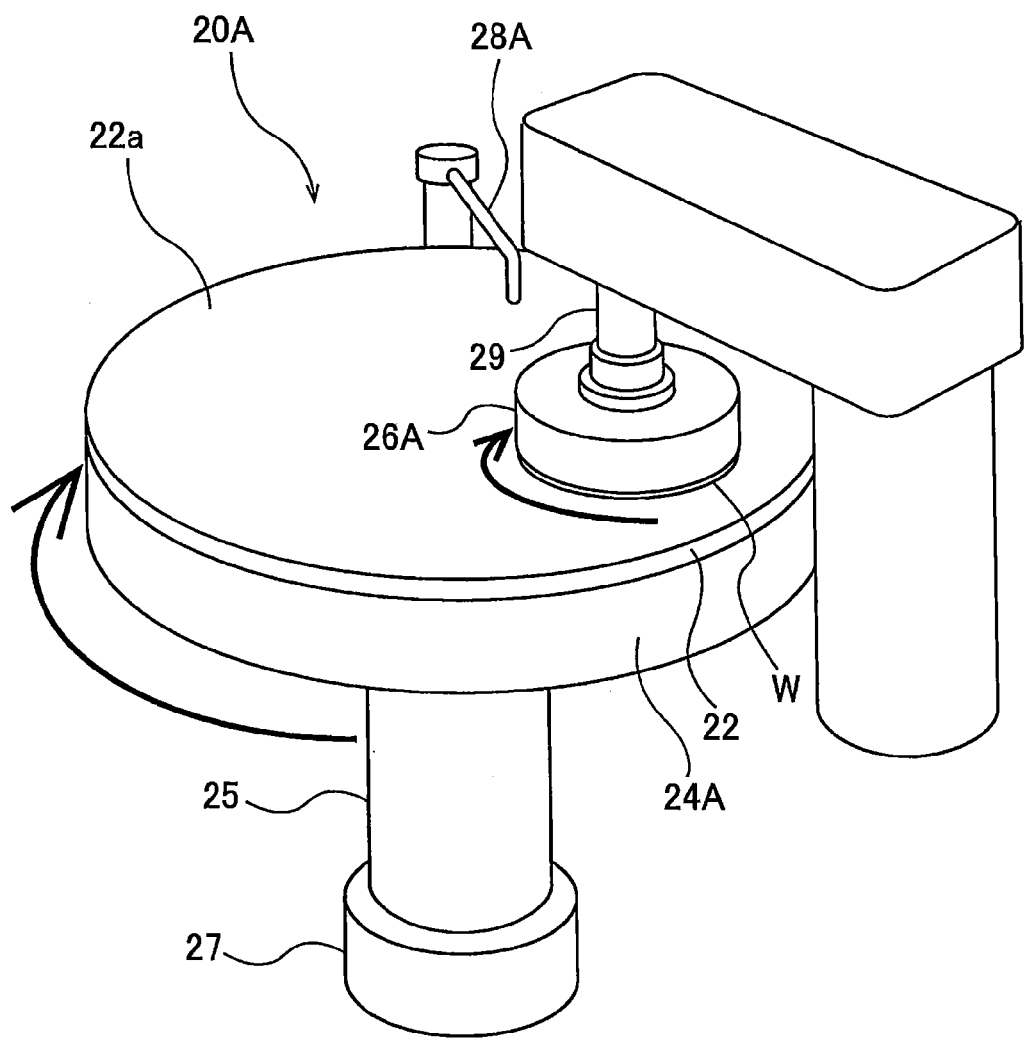
FIG. 2 is a perspective view showing a first polishing unit.

The first polishing unit 20A and the second polishing unit 20B have the same structure. Therefore, the first polishing unit 20A will be explained below. FIG. 2 is a perspective view showing the first polishing unit 20A. As shown in FIG. 2, the first polishing unit 20A includes the polishing table 24A supporting the polishing pad 22, the top ring 26A for pressing a wafer W against the polishing pad 22, and the polishing liquid supply nozzle 28A for supplying polishing liquid (or slurry) onto the polishing pad 22.

The polishing table 24A is coupled through a table shaft 25 to a table motor 27 disposed below the polishing table 24A, so that the polishing table 24A is rotated by the table motor 27 in a direction indicated by arrow. The polishing pad 22 is attached to an upper surface of the polishing table 24A, and an upper surface of the polishing pad 22 provides a polishing surface 22a for polishing the wafer W. The top ring 26A is fixed to a lower end of a top ring shaft 29. The top ring 26A is constructed so as to be capable of holding the wafer W on a lower surface thereof by vacuum suction.

Polishing of a surface of the wafer W is performed as follows. The top ring 26A and the polishing table 24A are respectively rotated in directions indicated by arrows, while the polishing liquid (slurry) is supplied onto the polishing pad 22 from the polishing liquid supply nozzle 28A. In this state, the top ring 26A presses the wafer W against the polishing surface 22a of the polishing pad 22. The surface of the wafer W is polished by a mechanical action of abrasive grains contained in the polishing liquid and a chemical action of a chemical component contained in the polishing liquid.

Figure 3:
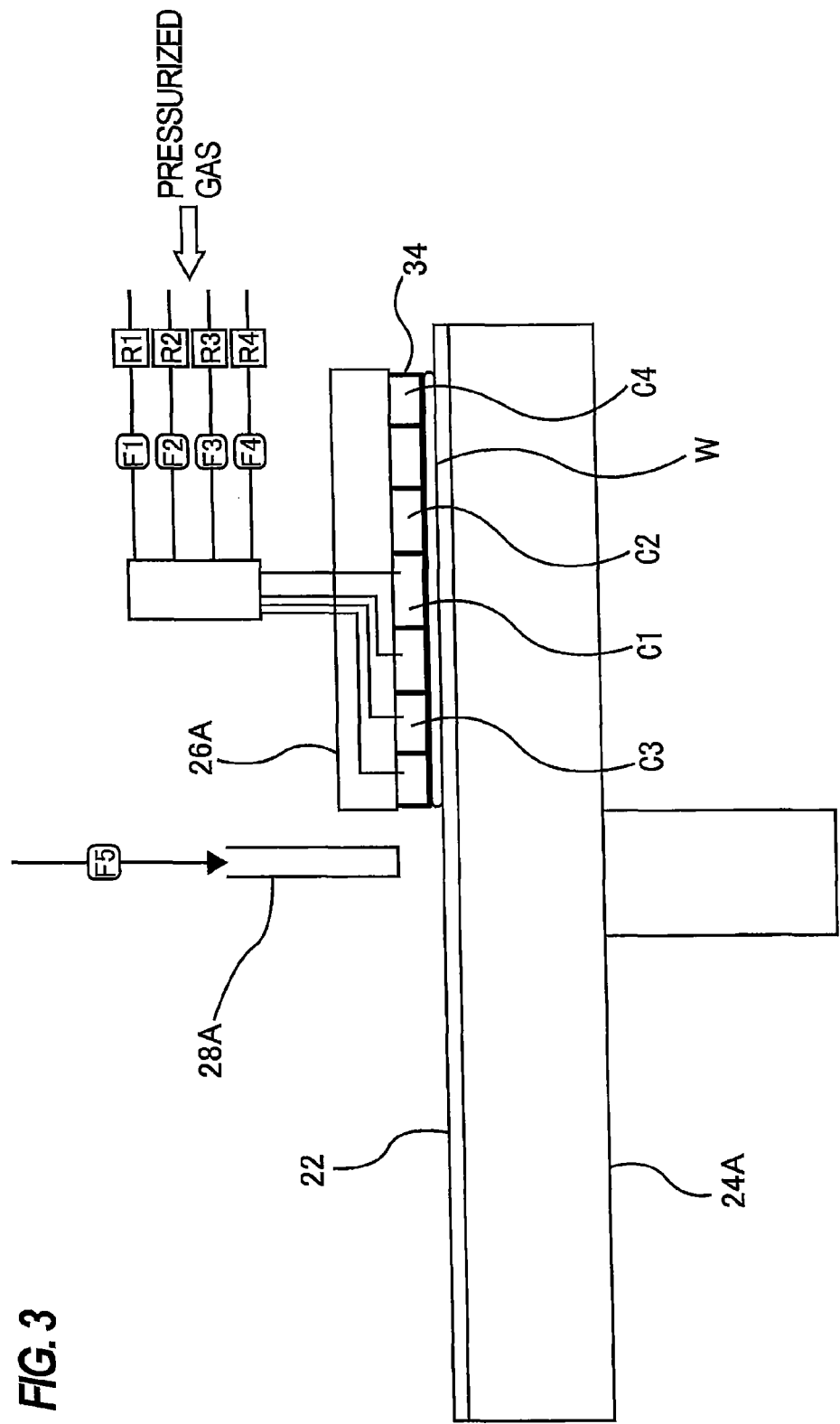
FIG. 3 is a schematic view showing a structure of a top ring.

FIG. 3 is a schematic view showing the structure of the top ring 26A. As shown in FIG. 3, the top ring 26A has pressure chambers C1, C2, C3, C4 defined in a lower portion thereof by an elastic membrane (or a membrane) 34. The pressure chambers C1, C2, C3, C4 are supplied with a pressurized gas, so that polishing pressure applied to the wafer W on the polishing pad 22 is adjusted by pressures in the pressure chambers C1, C2, C3, C4. The pressures in the pressure chambers C1, C2, C3, C4 are independently regulated by respective pressure regulators R1, R2, R3, R4. Therefore, the top ring 26A is able to apply different polishing pressures to plural zones of the wafer W.

Pressures of the pressurized gas supplied to the pressure chambers C1, C2, C3, C4 are measured by respective pressure sensors (not shown) incorporated in the pressure regulators R1, R2, R3, R4. Flow rates of the pressurized gas supplied to the pressure chambers C1, C2, C3, C4 are measured by respective flowmeters F1, F2, F3, F4. A flow rate of the polishing liquid (slurry) supplied from the polishing liquid supply nozzle 28A is measured by a flowmeter F5.

Referring back to FIG. 1, the cleaning section 10 will be described below. The cleaning section 10 is an area where a wafer, which has been polished, is cleaned and dried. The cleaning section 10 includes a first cleaning unit 61, a second cleaning unit 62, and a drying unit 63. A fourth transporting unit 68 is disposed between the first cleaning unit 61 and the second cleaning unit 62, and a fifth transporting unit 69 is disposed between the second cleaning unit 62 and the drying unit 63. The first cleaning unit 61, the fourth transporting unit 68, the second cleaning unit 62, the fifth transporting unit 69, and the drying unit 63 are arranged in series in this order.

The first cleaning unit 61 is a roll-sponge-type cleaning device configured to rub two rotating roll sponges against upper and lower surfaces of a wafer while supplying a cleaning liquid onto the wafer. The second cleaning unit 62 may be a pen-sponge-type cleaning device or a two-fluid-jet cleaning device. The pen-sponge-type cleaning device is a cleaning device configured to rub a rotating pen-type sponge against a surface of a wafer while supplying a cleaning liquid onto the wafer. The two-fluid-jet cleaning device is a cleaning device for cleaning a wafer by delivering two-fluid jet to the wafer. The drying unit 63 is a drying device for drying a wafer by supplying a surface of the wafer with an IPA vapor (a mixture of isopropyl alcohol and $N_2$ gas). The drying unit 63 may be a spin-drying device for drying a wafer by rotating the wafer at a high speed.

A processing sequence of polishing a wafer (or a substrate) using the above-described substrate processing apparatus will be described below. The first transporting unit 6 takes out a wafer from the wafer cassette and transfers the wafer to the reversing device 14. The inverting device 14 inverts the wafer so that a surface thereof, on which structures (e.g., devices) are formed, faces downward. The second transporting unit 40 receives the inverted wafer from the inverting device 14, and transports the wafer to the second transfer position TP2. The first top ring 26A of the first polishing unit 20A holds the wafer on its lower surface, transports the wafer to the position above the first polishing table 24A, and presses the wafer against the polishing pad 22 on the rotating first polishing table 24A, thereby polishing the surface of the wafer. The polished wafer is transported by the second transporting unit 40 from the second transfer position TP2 to the third transfer position TP3, and then the surface of the wafer is polished by the second polishing unit 20B in the same manner as described above. The wafer may be polished only by either the first polishing unit 20A or the second polishing unit 20B.

The wafer that has been polished by the first polishing unit 20A and/or the second polishing unit 20B is transported to the fourth transfer position TP4 by the second transporting unit 40, and is then transported from the fourth transfer position TP4 to the buffer station 53 by the third transporting unit 50. The wafer is transported by the fourth transporting unit 68 from the buffer station 53 to the first cleaning unit 61, and is then cleaned by the first cleaning unit 61.

The cleaned wafer is removed from the first cleaning unit 61 by the fourth transporting unit 68, and transported to the second cleaning unit 62, where the wafer is further cleaned. The cleaned wafer is removed from the second cleaning unit 62 by the fifth transporting unit 69, and is transported to the drying unit 63. The cleaned wafer is dried by the drying unit 63. The dried wafer is removed from the drying unit 63 by the first transporting unit 6, and is returned to the wafer cassette. In this manner, the wafer is polishing, cleaned, and dried in this order as described above.

The substrate processing apparatus is constructed as an assembly of the polishing units 20A, 20B, the cleaning units 61, 62, the drying unit 63, and the transporting units 6, 40, 50, 68, 69. These units will hereinafter be collectively referred to as processing units. These processing units serve as units for performing designated operations on a wafer. The designated operations include the operation of polishing a wafer, the operation of cleaning a wafer, the operation of drying a wafer, and the operation of transporting a wafer as described above.

Figure 4:
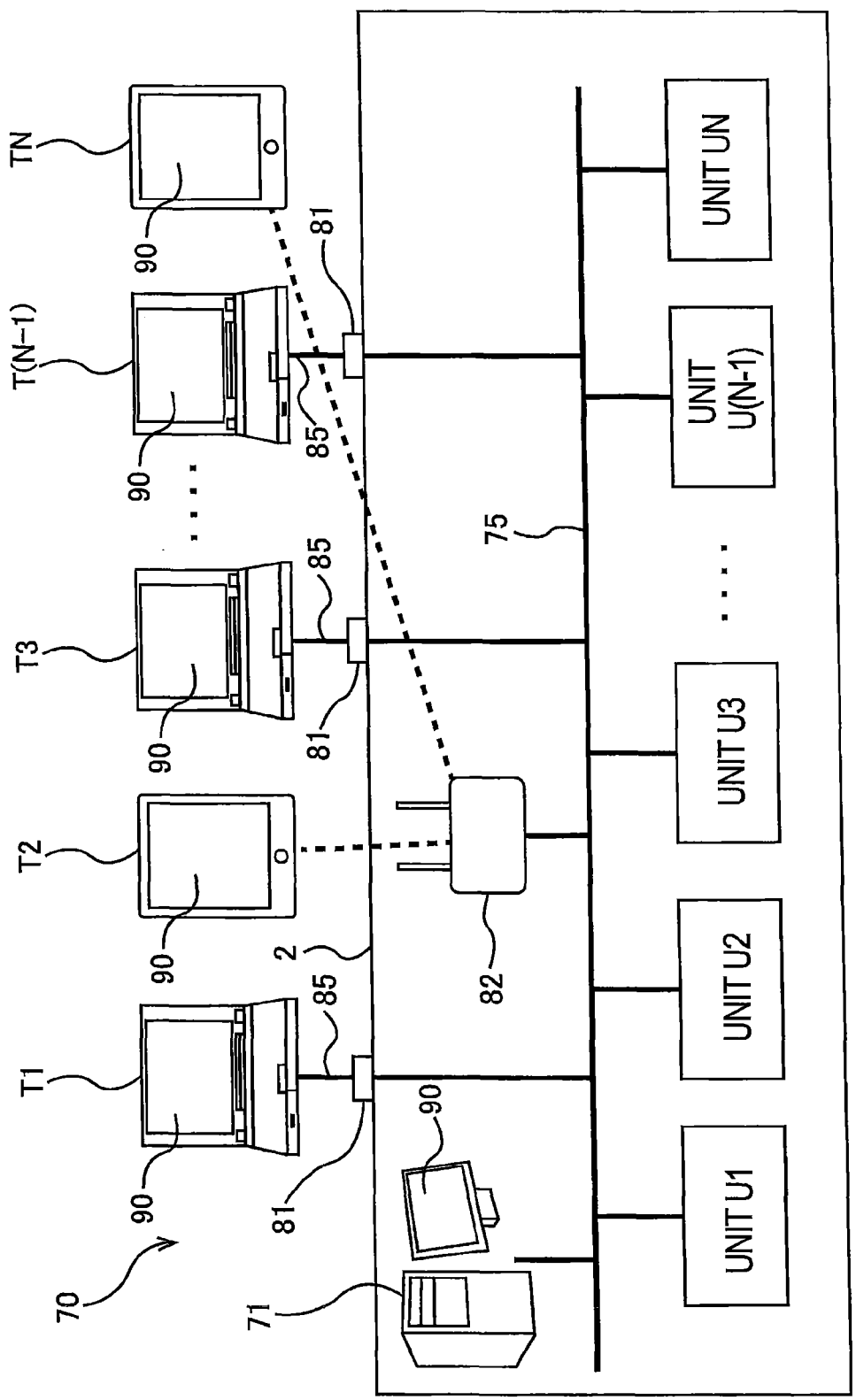
FIG. 4 is a schematic view of an adjustment apparatus for adjusting operations of processing units of the substrate processing apparatus.

As shown in FIG. 1, the substrate processing apparatus includes an adjustment apparatus (or an adjustment system) 70 for adjusting the operations of the processing units. The adjustment apparatus 70 will be described below with reference to FIG. 4. FIG. 4 is a schematic view of the adjustment apparatus 70 for adjusting the operations of the processing units of the substrate processing apparatus. As shown in FIG. 4, the adjustment apparatus 70 includes a main operation device 71 for manipulating processing units U1 to UN and adjusting each of the operations of the processing units U1 to UN, a network 75 connecting the processing units U1 to UN to the main operation device 71, terminal operation devices T1 to TN for manipulating the processing units U1 to UN and adjusting each of the operations of the processing units U1 to UN, and first connecting devices 81 and a second connecting device 82 which connect the terminal operation devices T1 to TN to the network 75. The terminal operation devices T1 to TN may be personal computers, mobile terminals, or the like.

The processing units U1 to UN represent first to N-th processing units. These processing units U1 to UN include the polishing units 20A, 20B, the cleaning units 61, 62, the drying unit 63, and the transporting units 6, 40, 50, 68, 69 described above. Although the substrate processing apparatus shown in FIG. 1 has the two polishing units 20A, 20B, the substrate processing apparatus may have three or more polishing units.

The network 75 is built in the substrate processing apparatus, and the processing units U1 to UN and the main operation device 71 are connected to the network 75. The terminal operation devices T1 to TN are connected to the network 75 via the first connecting devices 81 and the second connecting device 82. Therefore, the main operation device 71 and the terminal operation devices T1 to TN are connected to the processing units U1 to UN through the network 75. The main operation device 71 is configured to manipulate at least one processing unit selected in advance from the processing units U1 to UN and adjust the operation of the selected processing unit. Similarly, each of the terminal operation devices T1 to TN is configured to manipulate at least one processing unit selected in advance from the processing units U1 to UN and adjust the operation of the selected processing unit.

The first connecting devices 81 are connection ports (or connection terminals) to which communication cables 85, extending from the terminal operation devices, are to be connected. The first connecting devices 81 are mounted to the housing 2 of the substrate processing apparatus. The second connecting device 82 is a wireless LAN access point (which is also referred to as a wireless LAN station), which is a device capable of providing a wireless connection between the network 75 and the terminal operation devices.

The terminal operation devices T1 to TN can freely be connected to and disconnected from the network 75 through the first connecting devices 81 and/or the second connecting device 82.

In the example shown in FIG. 4, the terminal operation devices T1, T3, T(N−1) are connected to the network 75 through the first connecting devices 81, while the other terminal operation devices T2, TN are connected to the network 75 through the second connecting device 82. It is preferable to provide as many first connecting devices 81 (connection ports) as the number of processing units U1 to UN. Only the first connecting devices 81 or the second connecting device 82 may be provided. It is preferable to provide as many terminal operation devices T1 to TN as the number of processing units U1 to UN.

The main operation device 71 is connected to the network 75 at all times, while each one of the terminal operation devices T1 to TN can be disconnected from the network 75 through the first connecting devices 81 or the second connecting device 82. In other words, the first connecting devices 81 and the second connecting device 82 are devices that allow the terminal operation devices T1 to TN to be connected to and disconnected from the network 75. For example, the terminal operation device T1 can be disconnected from the network 75 by removing the communication cable (LAN cable) 85, connected to the terminal operation device T1, from the first connecting device 81 that serves as a connection port. Alternatively, the terminal operation device TN can be disconnected from the network 75 by cutting off a wireless communication that has been established between the terminal operation device TN and the second connecting device 82 that serves as a wireless LAN access point.

Consequently, the number of terminal operation devices to be used for adjusting the processing units U1 to UN can be reduced by disconnecting either one or some of the terminal operation devices T1 to TN from the network 75. On the other hand, the number of terminal operation devices to be used for adjusting the processing units U1 to UN can be increased by connecting the terminal operation device to unused one of the first connecting devices (connection ports) 81 through the communication cable 85 and/or by establishing the wireless communication between the second connecting device (wireless LAN access point) 82 and the terminal operation device.

The same software for adjusting the processing units U1 to UN is installed in advance in the main operation device 71 and the terminal operation devices T1 to TN. The main operation device 71 and the terminal operation devices T1 to TN perform the adjustment of the processing units U1 to UN according to this software. Generally, the software is upgraded to the latest version at regular or irregular intervals. As described above, some of the terminal operation devices T1 to TN may sometimes be disconnected from the network 75. If the terminal operation device has been disconnected from the network 75 for a long period of time, the version of the software installed in the disconnected terminal operation device may possibly be different from the version of the software installed in the main operation device 71.

In order that the same version of software may be always installed in the main operation device 71 and the terminal operation devices T1 to TN, the terminal operation devices T1 to TN are configured to automatically download the latest version of software from the main operation device 71 and install the downloaded software in themselves. The main operation device 71 has a storage (not shown), such as a hard disk drive, which stores the latest version of software therein. The terminal operation devices T1 to TN are configured to download the latest version of software from the main operation device 71 through the network 75 at regular intervals. Consequently, the same version of software is installed in the main operation device 71 and the terminal operation devices T1 to TN at all times.

Figure 5:
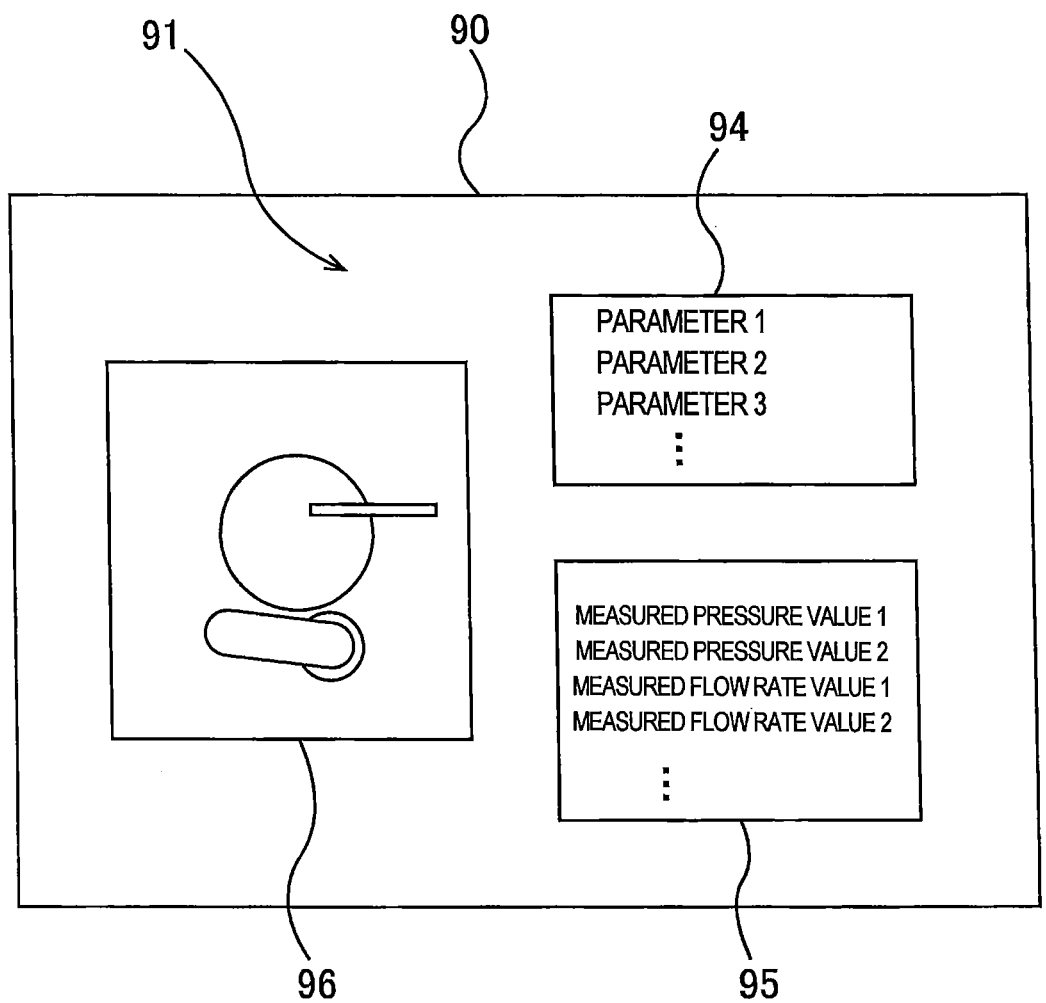
FIG. 5 is a diagraph showing a user interface displayed on operation screens of a main operation device and terminal operation devices.

The main operation device 71 and the terminal operation devices T1 to TN have respective operation screens 90. Each of the operation screens 90 is configured to display a user interface 91 as shown in FIG. 5. This user interface 91 is used when an operator adjusts the processing units U1 to UN. As shown in FIG. 5, the user interface 91 comprises a parameter window 94 for displaying a plurality of adjustment parameters, a measurement window 95 for displaying various kinds of measured values, and a unit window 96 for displaying a schematic view of the processing unit that has been selected.

The adjustment parameters include set values for the pressures and the flow rates of the pressurized gas to be supplied to the pressure chambers C1 to C4 of the top rings 26A, 26B (see FIG. 3), a set value for the flow rate of the polishing liquid (or slurry) to be supplied to the polishing pad 22, and positions at which the transporting units 6, 40, 50, 68, 69 (see FIG. 1) receive and transport a wafer. The measured values displayed in the measurement window 95 include measured values of the pressures and the flow rates of the pressurized gas that have been obtained by the pressure sensors in the pressure regulators R1 to R4 and the flowmeters F1 to F4 (see FIG. 3), and a measured value of the flow rate of the polishing liquid that has been obtained by the flowmeter F5 (see FIG. 3). The operator can change the adjustment parameters displayed on the user interface 91 to adjust the operation of the processing unit through the software and/or to manually adjust the position and the operation of the processing unit.

One or more operators can simultaneously adjust the processing units U1 to UN, using the main operation device 71 and the terminal operation devices T1 to TN. Therefore, a period of time required to adjust all the processing units U1 to UN can drastically be reduced. As described above, the latest version of the same software has been installed in the main operation device 71 and the terminal operation devices T1 to TN. Consequently, the user interfaces 91 displayed on the operation screens 90 of the main operation device 71 and the terminal operation devices T1 to TN are the same as each other. Such common user interface 91 enables the operator or operators to work efficiently.

Figure 6:
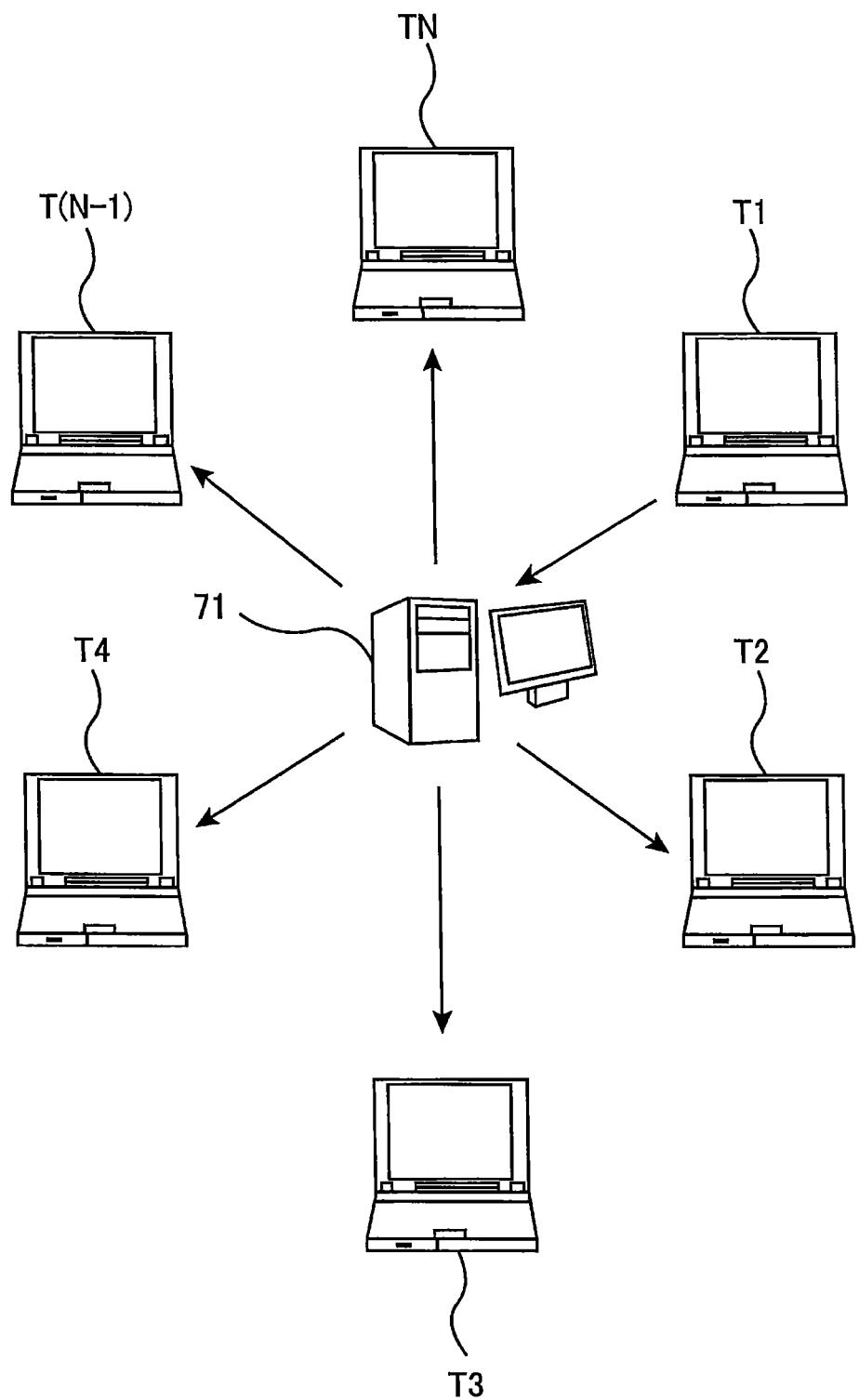
FIG. 6 is a schematic view showing the main operation device when transmitting adjustment parameters, which have been received from one of the terminal operation devices, to all of the other terminal operation devices.

The adjustment parameters that have been set and changed in all of the terminal operation devices T1 to TN are automatically sent to the main operation device 71, and are stored in the main operation device 71. Furthermore, as shown in FIG. 6, the main operation device 71 is configured to send the adjustment parameters, received from any one of the terminal operation devices T1 to TN, to all of the other terminal operation devices. As a consequence, the adjustment parameters stored in the main operation device 71 are shared by all of the main operation device 71 and the terminal operation devices T1 to TN through the network 75.

Each of the main operation device 71 and the terminal operation devices T1 to TN is configured to be able to create an operation recipe for one or more of the processing units U1 to UN. The operation recipe for the processing unit is composed of a sequence of steps that build operations (polishing, cleaning, drying, transporting, etc.) to be performed on a wafer, and operation rules for the steps. For example, the operation recipe for the first polishing unit 20A includes an operation sequence from a step of receiving a wafer to be polished to a step of transferring the polished wafer to the second transporting unit 40, a rotational speed of the top ring 26A, a rotational speed of the polishing table 24A, the pressures in the pressure chambers C1 to C4 of the top ring 26A, the flow rate of the polishing liquid to be supplied to the polishing pad 22, and a period of time during which the top ring 26A is to press a wafer against the polishing pad 22. The operation recipe that has been created by the main operation device 71 and the terminal operation devices T1 to TN is stored in the main operation device 71 and is shared by all of the main operation device 71 and the terminal operation devices T1 to TN through the network 75.

Each of the main operation device 71 and the terminal operation devices T1 to TN is capable of manipulating two or more processing units selected from the processing units U1 to UN. For example, in a case of adjusting the transporting operation of a wafer between the second polishing unit 20B and the second transporting unit 40, it is convenient for the operator to manipulate both the second polishing unit 20B and the second transporting unit 40, with one terminal operation device. In such a case, the operator can manipulate both the second polishing unit 20B and the second transporting unit 40, using one of the terminal operation devices T1 to TN or the main operation device 71.

When both the second polishing unit 20B and the second transporting unit 40 are being manipulated with a certain terminal operation device, if the second transporting device 40 is manipulated with another terminal operation device, the second transporting device 40 may make an unexpected motion and, as a result, the second polishing unit 20B and the second transporting unit 40 may possibly collide with each other. Moreover, if an operator is manipulating the processing unit while another operator is manually adjusting that processing unit, the operator may be exposed to a danger.

In order to prevent an accident that can occur due to an unexpected motion of the processing unit, the main operation device 71 has an interlock function that permits each one of the main operation device 71 and the terminal operation devices T1 to TN to exclusively manipulate one or more processing units. In other words, this interlock function is a function of not permitting any two of the main operation device 71 and the terminal operation devices T1 to TN to simultaneously manipulate any one of the processing units U1 to UN.

Details of the interlock function are as follows. Each of the terminal operation devices T1 to TN requests an exclusive manipulation right from the main operation device 71. This exclusive manipulation right is a right for exclusively manipulating at least one processing unit selected from the processing units U1 to UN. In response to the request from the terminal operation device, the main operation device 71 establishes an exclusive manipulation right for the selected processing unit. If an exclusive manipulation right has already been established for the selected processing unit, the main operation device 71 rejects the request from the terminal operation device, and does not establish an exclusive manipulation right. Similarly, the main operation device 71 establishes an exclusive manipulation right for enabling the main operation device 71 itself to exclusively manipulate at least one processing unit selected from the processing units U1 to UN, unless an exclusive manipulation right has already been established for the selected processing unit.

In this manner, the main operation device 71 is configured not to establish a plurality of exclusive manipulation rights for one processing unit. Each processing unit is manipulated only by either the terminal operation device or the main operation device 71 that has the exclusive manipulation right for that processing unit.

The main operation device 71 can terminate an exclusive manipulation right, owned by the main operation device 71, by a terminating action of itself. Furthermore, the main operation device 71 can terminate an exclusive manipulation right, owned by each of the terminal operation devices T1 to TN, in response to a request from each of the terminal operation devices. Once the exclusive manipulation right for the processing unit is terminated, the main operation device 71 can establish a new exclusive manipulation right for that processing unit according to an establishing process performed by the main operation device 71 itself or in response to a request from the terminal operation device.

Figure 7:
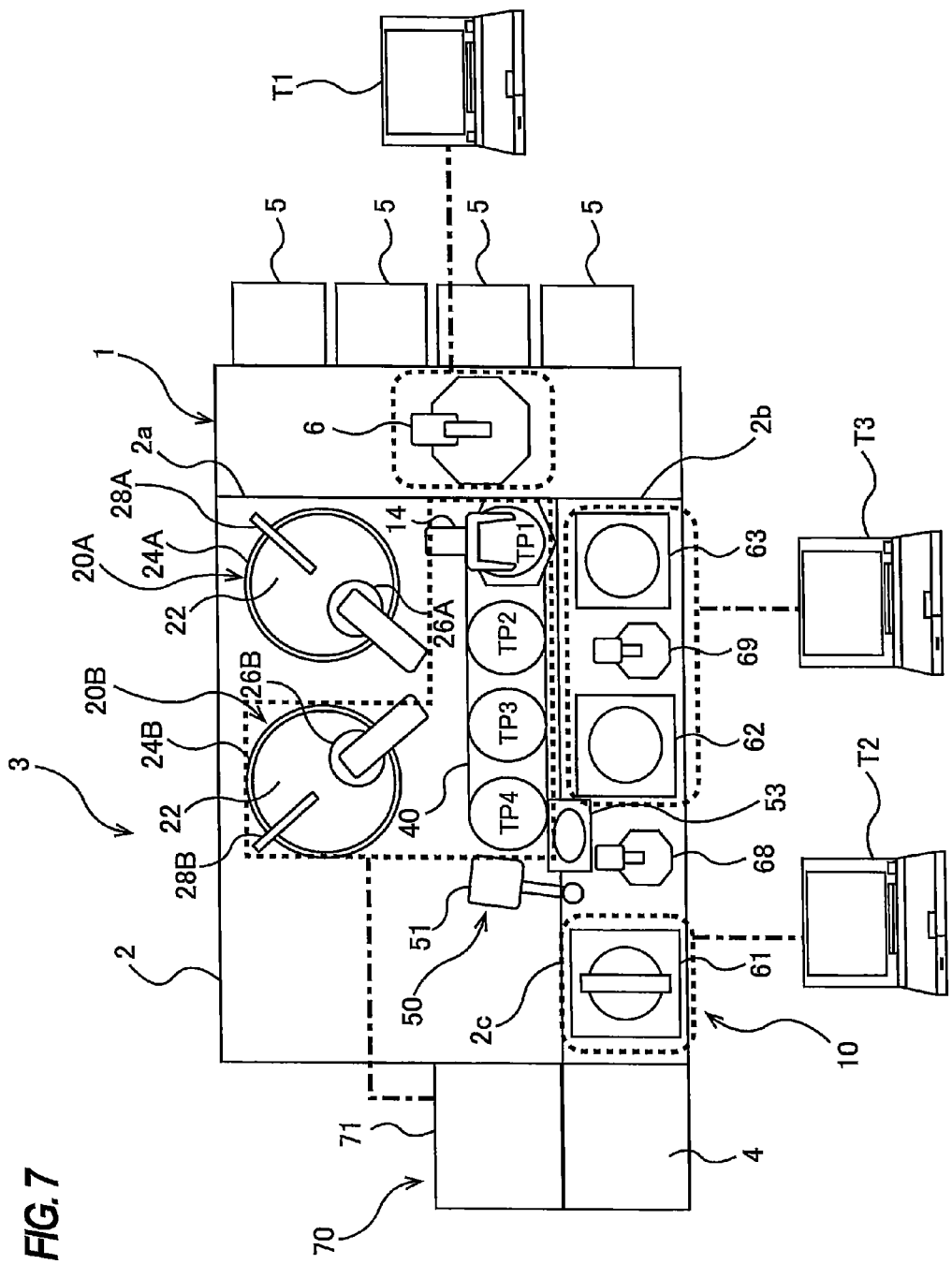
FIG. 7 is a view showing the main operation device and three terminal operation devices when manipulating the processing units.

FIG. 7 is a view showing the main operation device 71 and three terminal operation devices T1, T2, T3 when manipulating the processing units. In FIG. 7, the main operation device 71 manipulates the second polishing unit 20B and the second transporting unit 40, the terminal operation device T1 manipulates the first transporting unit 6, the terminal operation device T2 manipulates the first cleaning unit 61, and the terminal operation device T3 manipulates the second cleaning unit 62 and the drying unit 63. In this manner, the main operation device 71 and the three terminal operation devices T1, T2, T3 can simultaneously manipulate the multiple processing units and can adjust the operations of the processing units. As can be seen from FIG. 7, one processing unit is manipulated by one terminal operation device or the main operation device 71, without exception.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. An adjustment apparatus comprising:
   a main terminal having software installed therein that instructs the main terminal to adjust designated operations of a plurality of processing stations, the processing stations being included in one substrate processing apparatus and performing the designated operations on a substrate;
   secondary terminals having software installed therein that instructs the secondary terminals to adjust the designated operations of the processing stations, each of the main terminal and the secondary terminals having a user interface;
   a network that connects the processing stations, secondary terminals, and the main terminal to each other; and
   connection ports that removably connect the secondary terminals to the network, wherein each of the secondary terminals has a function to request an exclusive manipulation right that allows one secondary terminal to exclusively manipulate at least one processing station selected from the processing stations, and the main terminal has a function to reject the request from the secondary terminal if an exclusive manipulation right has already been established for the selected processing station.

2. The adjustment apparatus according to claim 1, wherein the main terminal has a storage that stores therein adjustment parameters sent from the secondary terminals, the adjustment parameters having been used to adjust the processing stations by the secondary terminals.

3. The adjustment apparatus according to claim 2, wherein the adjustment parameters stored in the main terminal are shared by all of the main terminal and the secondary terminals through the network.

4. The adjustment apparatus according to claim 1, wherein the software installed in the main terminal and the software installed in the secondary terminals is the same software.

5. The adjustment apparatus according to claim 4, wherein the main terminal and the secondary terminals have the same user interfaces.

6. The adjustment apparatus according to claim 4, wherein the secondary terminals are configured to automatically download the software stored in the main terminal through the network, and install the downloaded software therein.

7. The adjustment apparatus according to claim 1, wherein the number of secondary terminals is the same as the number of processing stations.

8. The adjustment apparatus according to claim 1, wherein the user interface includes a parameter window.

9. A substrate processing apparatus comprising:
processing stations for performing designated operations on a substrate; and
an adjustment system for adjusting the processing stations, the adjustment system including:
a main terminal having software installed therein that instructs the main terminal to adjust the designated operations of the processing stations;
secondary terminals having software installed therein that instructs the secondary terminals to adjust the designated operations of the processing stations, each of the main terminal and the secondary terminals having a user interface;
a network that connects the processing stations, secondary terminals, and the main terminal to each other; and
connection ports that removably connect the secondary terminals to the network, wherein each of the secondary terminals has a function to request an exclusive manipulation right that allows one secondary terminal to exclusively manipulate at least one processing station selected from the processing stations, and the main terminal has a function to reject the request from the secondary terminal if an exclusive manipulation right has already been established for the selected processing station.

10. The substrate processing apparatus according to claim 9, wherein the main terminal has a storage that stores therein adjustment parameters sent from the secondary terminals, the adjustment parameters having been used to adjust the processing stations by the secondary terminals.

11. The substrate processing apparatus according to claim 10, wherein the adjustment parameters stored in the main terminal are shared by all of the main terminal and the secondary terminals through the network.

12. The substrate processing apparatus according to claim 9, wherein the software installed in the main terminal and the software installed in the secondary terminals is the same software.

13. The substrate processing apparatus according to claim 12, wherein the main terminal and the secondary terminals terminal operation devices have the same user interfaces.

14. The substrate processing apparatus according to claim 12, wherein the secondary terminals are configured to automatically download the software stored in the main terminal through the network, and install the downloaded software therein.

15. The substrate processing apparatus according to claim 9, wherein the number of secondary terminals is the same as the number of processing stations.

16. The substrate processing apparatus according to claim 9, wherein the user interface includes a parameter window.

\* \* \* \* \*